(12) United States Patent
Odom

(10) Patent No.: US 7,363,592 B1
(45) Date of Patent: Apr. 22, 2008

(54) TOOL GROUP MANIPULATIONS

(76) Inventor: Gary Odom, 15505 SW. Bulrush La., Tigard, OR (US) 97223

( * ) Notice: Subject to any disclaimer, the term of this patent is extended or adjusted under 35 U.S.C. 154(b) by 239 days.

(21) Appl. No.: 11/125,276

(22) Filed: May 9, 2005

Related U.S. Application Data

(63) Continuation of application No. 09/707,194, filed on Nov. 6, 2000, now Pat. No. 7,036,087.

(51) Int. Cl.
 *G06F 13/00* (2006.01)
 *G06F 15/00* (2006.01)
(52) U.S. Cl. ...................................... 715/779; 715/786

(58) Field of Classification Search ........ 715/733–744, 715/762, 779, 810, 838, 840, 731, 711, 786
See application file for complete search history.

(56) References Cited

U.S. PATENT DOCUMENTS 5,644,737 A * 7/1997 Tuniman et al. ............ 715/810

* cited by examiner

*Primary Examiner*—Cao (Kevin) Nguyen

(57) ABSTRACT

Herein discloses interactive user manipulations of tool groups within toolbars User-responsive tool group manipulation facilitates greater utility, user control, and customization potential, for toolbars.

19 Claims, 5 Drawing Sheets

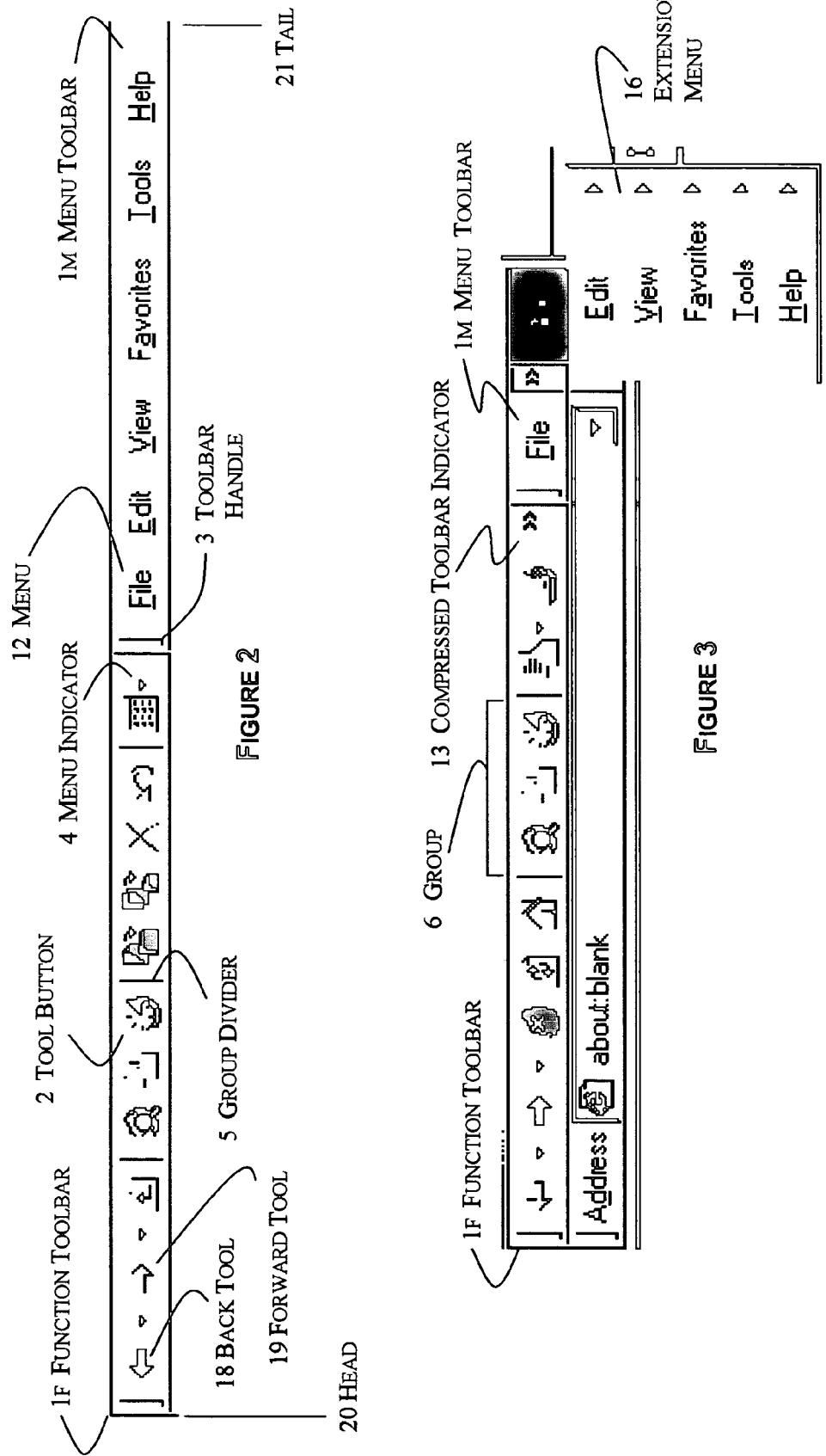

| FEATURE | MOUSE ACTION | KEY |
|---|---|---|
| JOIN TOOLBARS | DRAG TOOLBAR HANDLE ONTO END OF JOINING TOOLBAR | CTL |
| SEPARATE GROUPS | DRAG GROUP DIVIDER VERTICALLY | CTL |
| MOVE GROUP | DRAG GROUP | CTL & ALT |
| MANUALLY COMPRESS/EXPAND GROUP | DRAG GROUP DIVIDER HORIZONTALLY | |
| ONE-CLICK COMPRESS/EXPAND GROUP | CLICK GROUP DIVIDER (TOOLBAR HANDLE IF FIRST GROUP) | ALT |
| TOGGLE TOOLBAR WRAP | CLICK WRAP TOGGLE BUTTON | |
| MOVE, REMOVE TOOL | DRAG TOOL | ALT |
| COPY TOOL | DRAG TOOL | ESC |

FIGURE 9

TOOL GROUP MANIPULATIONS

CROSS-REFERENCE TO RELATED APPLICATIONS

Compliant with 35 U.S.C. § 120, this application is a continuation of U.S. patent application Ser. No. 09/707,194, now U.S. Pat. No. 7,036,087, thereby claiming the priority date of Nov. 6, 2000.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The field of invention is computer graphical user interface.

2. Description of the Related Art Including Information Disclosed Under 37 CFR 1.97 and 1.98

Toolbars have become a standard feature of computer software applications. Even menus have become ensconced in toolbars. The reason is that toolbars offer immediate, single-click access to commonly used features. The tools themselves, often iconically symbolic, become instantly recognizable, and thus, affording rapid recognition, accommodate efficient action.

A recent advance has been to visually distinguish groups of tools, as a further means for more efficient recognition of tools by similar functionality. What has been lacking are the means for allowing easy user manipulation of tool groups as an integral entity.

BRIEF SUMMARY OF THE INVENTION

As described herein, a tool group becomes a user-manipulable entity unto itself. This accommodates easy reorganization of a toolbar, either by the user, or automatically, to further productivity. Other manipulations, such as allowing a user to wrap a toolbar comprising multiple groups, or merge two toolbars, or selectively hide tools on a group-by-group basis, provide further conveniences to users in having toolbars behave as desired. Another aspect is automatic configuration of tools and groups of tools in a toolbar based upon tool usage frequency.

BRIEF DESCRIPTION OF THE SEVERAL VIEWS OF THE DRAWINGS

FIG. 2 depicts toolbars in the prior art.

FIG. 3 depicts compressed toolbars in the prior art.

FIG. 9 summarizes manual toolbar manipulations.

DETAILED DESCRIPTION OF THE INVENTION

Figure 1:
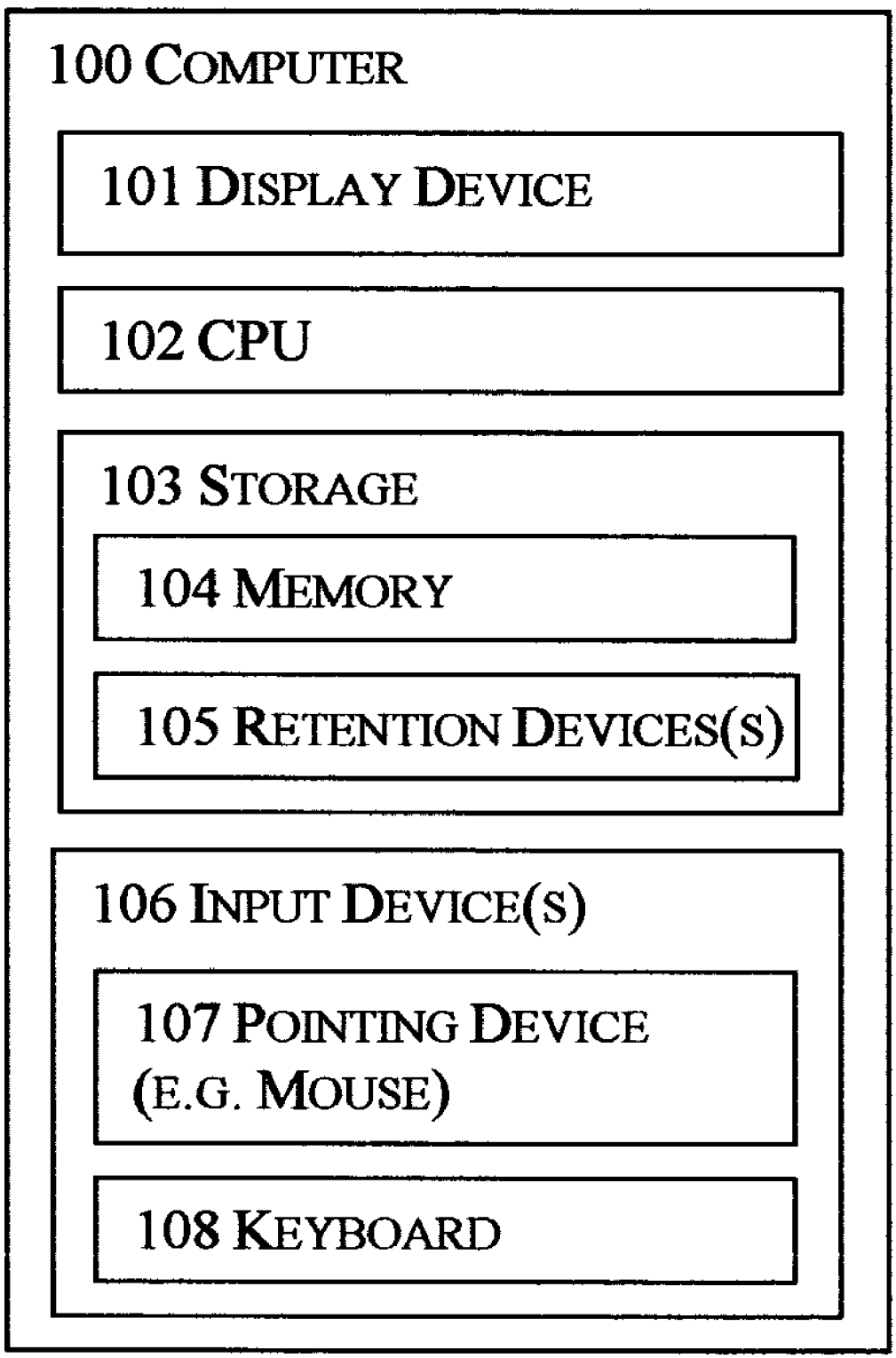
FIG. 1 is a block diagram of a computer suitable for practicing the invention.

FIG. 1 is a block diagram of a computer 100 which comprises at least a display device 101; CPU 102; storage 103, which comprises memory 104 and optionally one or more devices with retention medium(s) 105 such as hard disks, diskettes, compact disks, or tape; and one or more input devices 106, such a keyboard 108 and/or one or more pointing devices 107, such as a mouse. The mouse 107 is the most popular pointing device 107 for desktop computers 100. In the description below, the mention of mouse 107 is meant to include pointing devices 107 of any type. Such a computer 100 is suitable for use with this invention.

FIGS. 2 and 3 depicts toolbars in the prior art. Two toolbars 1 are depicted: a function toolbar 1*f* in front of a menu toolbar 1*m*, horizontally arranged end-to-end. A toolbar 1 comprises a set of tool buttons 2, typically represented as icons symbolic of functional features. A menu toolbar 1*m* comprises menus 12, as depicted. A toolbar 1 has a handle 3 by which the toolbar 1 may be moved.

Tools 2 are typically functionally segregated by group dividers 5. The set of tools 2 between group dividers 5, or between one end of a toolbar 1 and a group divider 5 is referred to as a group 6 of tools 2. For example, tools 2 derived from the 'File' menu 12 may be segregated by a group divider 5 from tools derived from the 'Edit' menu 12. In the prior art, users may customize tools 2 while in a customization mode, grouping and partitioning tools 2 without regard to their functional derivation. Also in the prior art, tools 2 may be added or removed via a menu 12 modelessly.

Toolbars 1 are depicted horizontally, but may have a vertical orientation as well. In the preferred embodiment, for horizontal orientation, the head 20 of a toolbar 1 is at the left, the end (tail) 21 at the right. For a horizontal toolbar 1, the length of a toolbar 1 or toolbar group 6 is the measurable distance from the head 20 of the toolbar 1 or group 6 to its tail 21. In the preferred embodiment, for vertical orientation, the head 20 of the toolbar 1 is at the top, the end (tail) 21 at the bottom. Tools 2 (with respect to a group 6) and groups 6 (with respect to a toolbar 1) also have a head 20 (horizontal: left or vertical: top) and tail 21 (horizontal: right or vertical: bottom) orientation corresponding to the toolbar 1.

Directly means by direct manual manipulation with the intended target, as opposed to indirectly, which would be a result caused by indirect action, such as indirectly changing the length of a toolbar 1 or toolbar group 6 by selecting a change in toolbar 1 icon size via selection of a menu or dialog item. Manual means via user interaction (as opposed to automatic, such a change based upon usage frequency).

Other than adding or removing tools 2, tool 2 customization in the prior art occurs only within a customization mode. A mode is an exclusive mode of operation. In modal operation, a user is limited to operations specific to the particular mode. In tool 2 customization mode, for example, a user can only customize the toolbar 1; nominal application operations are inaccessible until the user quits the mode. In modeless operation, a user can act upon the nominal set of available operations. In graphic user interfaces, dialogs are commonly used to visibly indicate modality (though modeless dialogs also exist). Typically when a modal dialog is visible in the prior art, clicking the cursor outside the designated area of modality typically produces a warning sound, but does nothing else. In modes, operations specific to the mode (modal operations) must be completed before nominal application operations may proceed.

FIG. 3 depicts compressed toolbars 1. A toolbar 1 in the prior art is compressed if the window in which the toolbar 1 resides is narrowed to less than the length of one or more toolbars 1 arranged horizontally end-to-end. Compressed toolbars 1 may have a compressed toolbar indicator 13 that acts as an access mechanism for an extension menu 16 for access to tools 2 (or menus 12 for menu toolbars 1m) that are no longer immediately visible.

FIGS. 4 through 8 depict, and FIG. 9 summarizes, described toolbar 1 innovations and preferred embodiment methods, all of which are modeless. Other methods may be employed to equivalent result in alternate embodiments, including via menu item, function button, different selection or drag technique with or without specific keys pressed singularly or in combination, different key presses singularly or in combination, or other equivalent means.

Figure 4:
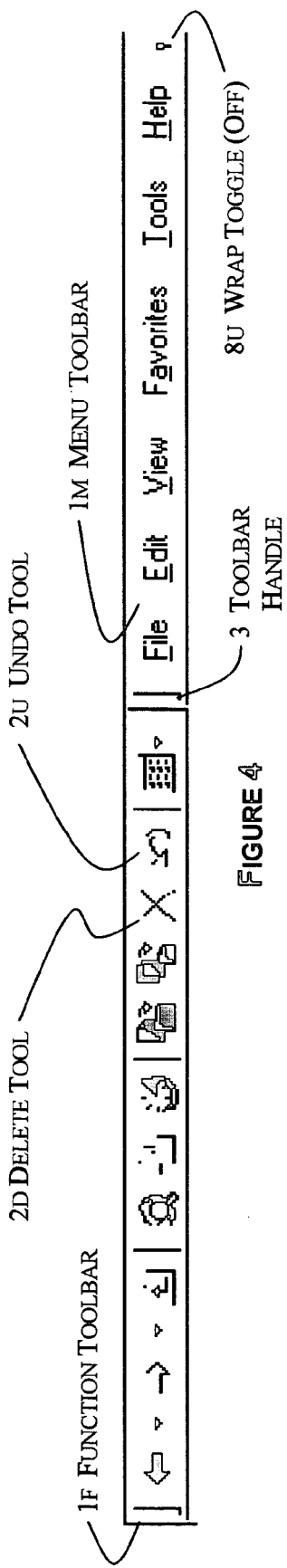
FIGS. 4-5 depict aspects of toolbars and toolbar manipulations.

FIG. 4 depicts two toolbars 1 arranged horizontally end-to-end. Depicted in FIG. 5, toolbars 1 may be merged (joined) 11: a tail-end 21 toolbar 1 (in the depicted example, the menu toolbar 1m) may be joined 11 to a head-end 20 toolbar 1 (in the depicted example, the function toolbar 1f). The preferred embodiment to merge 11 toolbars 1 is by selecting the tail-end 21 toolbar handle 3 (toolbar 1m in the Figure) while pressing the 'Ctl' key, then dragging the mouse 107 pointer onto the back end of the head-end toolbar (1f in the Figure), then releasing the mouse 107 button; not much movement, distance-wise. Upon completion of a merge operation in the preferred embodiment, the toolbar handle 3 becomes a group divider 5.

To separate a group 6 and horizontally succeeding groups 6 (i.e., the rest of the toolbar 1) in the preferred embodiment, select the group 6 while pressing the 'Ctl' key, then drag the group divider 5 vertically; in other words, pull part of the toolbar 1 vertically off from the desired head 20 group 5.

Figure 5:
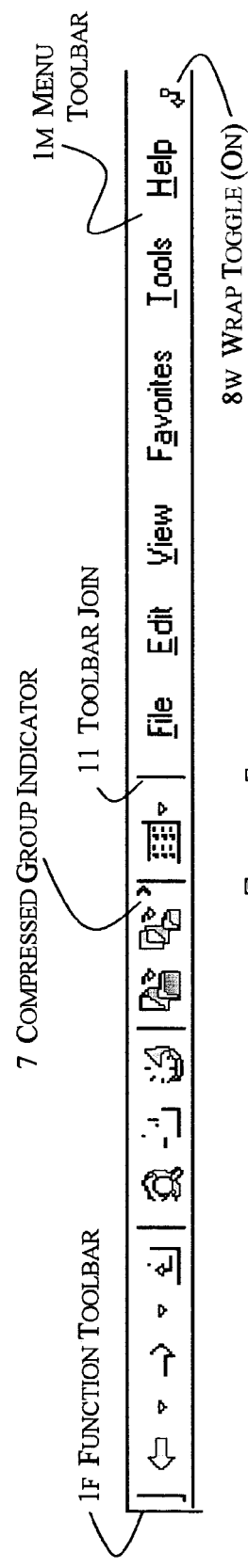

As depicted in FIGS. 4 and 5, groups 6 may be directly compressed and expanded in the preferred embodiment by sliding the tail 21 group divider 5 horizontally. As depicted, the delete tool 2d and undo tool 2u shown in FIG. 4 have been hidden in FIG. 5. A compressed group indicator 7 signals a compressed group 6 in the preferred embodiment. In the preferred embodiment, a collapsed group 6 may be expanded by one tool 2 by clicking the tail group divider 5 or compressed group indicator 7. In one embodiment, a group 6 may be collapsed by one tool 2 by clicking the tail group divider 5 or compressed group indicator 7 while pressing the 'Esc' key. In the preferred embodiment, a collapsed group 6 may be fully expanded by clicking the tail group divider 5 or compressed group indicator 7 while pressing the 'Alt' key. Likewise, clicking a tail-end 21 group divider 5 while holding the 'Alt' key in the preferred embodiment compresses a group 6 if the group 6 is fully expanded. In the preferred embodiment, 1f the group 6 had never been compressed by a user, the group 6 is compressed to display a single tool 2. If the group 6 has been compressed before, in the preferred embodiment the group 6 is compressed to the previously compressed number of tools 2. In other words, clicking a tail-end 21 group divider 5 while pressing the 'Alt' key in the preferred embodiment acts as a compression/expansion toggle.

Figure 6:
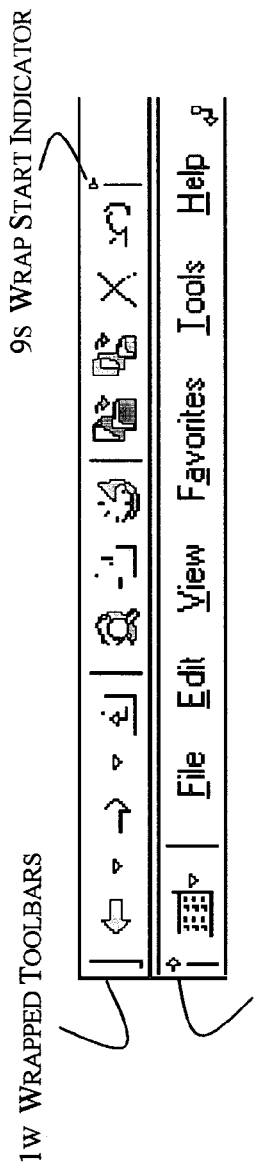
FIG. 6 depicts a wrapped toolbar.

A strip of one or more toolbars 1 may wrap-around when their enclosing window is narrowed such that the entire toolbar 1 strip is not visible. In the preferred embodiment, a wrap toggle button 8 at the end 21 of a toolbar 1 strip is clicked to enable 8w or disable 8u toolbar wrapping. FIG. 4 depicts the wrap toggle 8 off. FIG. 5 depicts the wrap toggle 8 on. FIG. 6 depicts a wrapped toolbar 1w. As depicted, in the preferred embodiment there are wrap indicators 9 to indicate wrapped toolbar 1w state.

Figure 7:
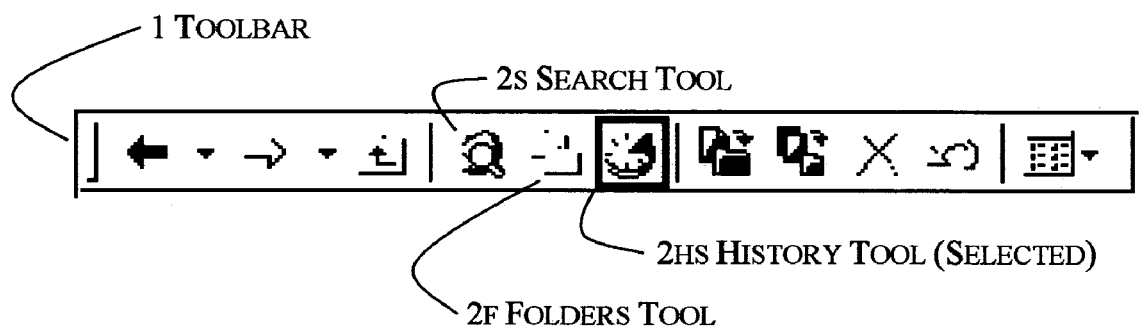
FIG. 7 depicts a selected tool in a toolbar.
Figure 8:
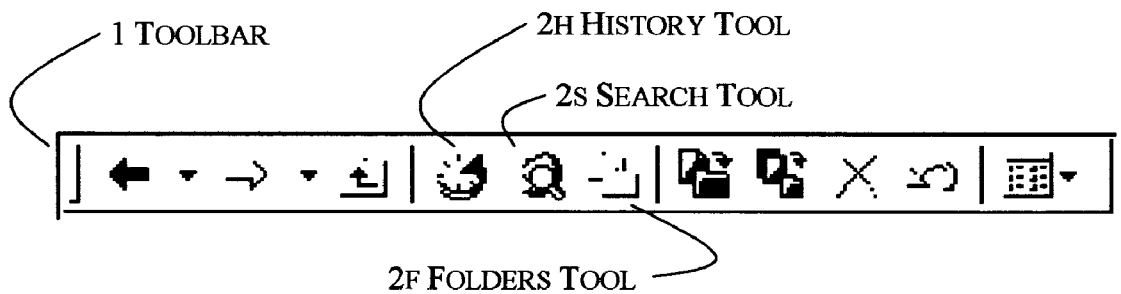
FIG. 8 depicts rearranged tools in a toolbar.

In the preferred embodiment, a tool 2 may be modelessly moved within a group 6 or toolbar 1, moved to another toolbar 1, or removed from a toolbar 1, by pressing the 'Alt' key, then selecting and dragging a tool 2: to move a tool 2, drag the tool 2 to its target location over a toolbar 1 and release the mouse 107 button; to remove a tool 2, drag the tool 2 outside of any toolbar 1 and release the mouse 107 button. In the preferred embodiment, a tool 2 may be modelessly copied within a group 6 or toolbar 1, copied to another toolbar 1, or copied to create a new toolbar 1, by pressing the 'Esc' key, then selecting and dragging a tool 2: to copy a tool 2, drag the tool 2 to its target location over a toolbar 1 and release the mouse 107 button; to create a new toolbar 1 from a tool 2, while retaining the tool 2 in its present position, drag the tool 2 outside of any toolbar 1 and release the mouse 107 button. FIG. 7 depicts an example of visual feedback to a user of a selected tool 2hs. FIG. 8 depicts the resultant rearrangement from of a tool 2 move by dropping the history tool 2h onto the toolbar 1 in front of the search tool 2s.

The technique of select, 'drag & drop', as it is commonly called, is known in the prior art, but has never been known to be applied to modeless configuration of toolbar 1 components. As in the prior art, ambiguous placement by sloppy dropping, such as dropping right on top rather than decidedly in front or behind, can be resolved to one pixel resolution fore or rear, and, if dropped dead center on top of a tool 2, a simple default rule to drop behind (the preferred embodiment) or in front of the existing tool 2 applied.

Similar to tool 2 rearrangement, in the preferred embodiment, a group 6 may be modelessly rearranged within a toolbar 1, moved to another toolbar 1, or taken off a toolbar 1 to become a separate toolbar 1 unto itself, by selecting the group 6 while pressing the 'Ctl' and 'Alt' keys, then dragging a group 6 to its target location and releasing the mouse 107 button. Note that in the preferred embodiment, a group 6 itself is selected, not group divider 5 nor toolbar handle 3; also note the unique key press combination in the preferred embodiment. If creating a new toolbar 1 from one or more tools 2 or groups 6, a user may be prompted to enter a new toolbar 1 name.

Optionally, tools 2 within a group 6 or integral (whole) groups 6 within a toolbar 1 may be automatically rearranged based upon usage frequency. A frequency (tool 2 usage) counter tracks each tool's 2 selection. Within a group 6, a frequently used tool 2 may be promoted toward the head 20 of a group 6 after a relative usage frequency threshold is achieved. The preferred embodiment of frequency threshold is to shift a tail-end tool 2 vis-à-vis its head-end 20 neighbor after a minimum of eight uses between the two tools 2 when the relative proportion of usage favors the tail-end 21 tool 2 by a relative two-to-one: so, a six (tail 21) to two (head 20) relative tool 2 use would cause a shift, as would a 7-3, but a 5-3 margin is less than two-to-one, so would not cause a shift. Similar methods may be employed in tracking relative aggregate usage of tools 2 in a group 6 to similarly rearrange groups 6 of a toolbar 1 based upon usage frequency.

In the preferred embodiment, tool 2 usage counters are not reset until necessary due to counter overflow. In alternate embodiments, tool 2 usage counters may be reset or otherwise adjusted after a shift.

Shifting tools 2 or groups 6 of toolbars 1 around automatically based upon usage frequency may seem spooky to users (due to its infrequency, a user may not remember setting such an option), so it is recommended that a confirmation prompt optionally appear each time a rearrangement is in the offing to inform and ask consent for the shift.

Optionally, some tools 2 or groups 6 may be exempt from rearrangement. For example, swapping the back 18 and forward 19 tools 2 might inherently be confusing, as the two have a culturally decided relational orientation as time vectors. Similarly, for example, groups 6 of toolbars 1 may have a certain logical order, such as correspondence to menu 12 order, whereby rearrangement may be undesirable. In the preferred embodiment, rearrangement exemption is a user option.

The invention claimed is:

1. A computer-implemented method comprising:
   displaying a toolbar comprising a plurality of tool groups,
   wherein a tool group comprises at least one user-selectable tool,
   wherein visibly designating at least one said tool group by at least one user-manipulatable divider located near at least one end of said tool group,
   wherein said tool group divider visibly differs from a user-manipulatable toolbar handle if a said toolbar handle is visible,
   wherein a said visible toolbar handle facilitates user-directable movement of said toolbar,
   wherein said tool group divider facilitates user-directable movement related to a tool group;
   receiving user selection of a tool group divider;
   interactively tracking user indication of movement related to at least one tool group via user-interactive movement related to said tool group divider;
   ceasing said tracking based upon receiving user indication thereof;
   altering said tool group condition related to said toolbar according to said tracking indication and said ceasing indication.

2. The method according to claim 1, further comprising:
   receiving user selection of a toolbar handle;
   interactively tracking user indication of movement of a toolbar via user-interactive movement related to said toolbar handle;
   ceasing said toolbar tracking based upon receiving user indication;
   receiving user indication for merging two toolbars;
   merging two toolbars based upon user-indicated movement of said toolbar handle in proximity to another toolbar concurrently with receiving user indication for merging two toolbars.

3. The method to claim 1, wherein said altering said tool group condition comprises, at least in part, altering the length of at least one tool group.

4. The method according to claim 1, wherein said altering said tool group condition comprises, at least in part, hiding at least one tool.

5. The method according to claim 1, wherein said altering said tool group condition comprises, at least in part, altering the number of tools displayed in at least one tool group.

6. The method according to claim 1, wherein said altering said tool group condition comprises, at least in part, showing at least one tool previously hidden.

7. The method according to claim 1, wherein said altering said tool group condition comprises, at least in part, not changing the length, nor location, of said toolbar.

8. A computer-implemented method comprising:
   displaying a toolbar comprising at least one first tool group,
   wherein said first tool group comprises at least one user-selectable tool,
   wherein visibly designating said first tool group by at least one user-manipulatable divider located near at least one end of said first tool group,
   wherein said first tool group divider is visually distinct from a said tool and from any visible means for directly manipulating said toolbar in its entirety, and
   wherein said tool group divider is user-manipulatable for altering the condition of said tool group;
   selecting said first tool group;
   interactively tracking user indication of movement related to said first tool group until receiving user indication to cease tracking; and
   altering the condition of at least one tool group on said toolbar based upon said tracked user indications.

9. The method according to claim 8, wherein said altered condition comprises, at least in part, separating said first tool group from said toolbar.

10. The method according to claim 8, wherein said altered condition comprises, at least in part, altering the number of tools displayed in at least one tool group on said toolbar.

11. The method according to claim 8, further comprising:
    receiving user selection of a input device key contemporaneous with selecting said first tool group; and
    altering the condition of said first tool group based, at least in part, upon said tracked user indications and said user key selection.

12. The method according to claim 8, further comprising:
    checking at least one rule set prior to said altering said tool group condition.

13. The method according to claim 12,
    wherein at least one rule in said rule set pertains to exemptions to rearrangement of at least one tool.

14. The method according to claim 8, further comprising:
    visibly indicating said altered condition when the number of tools displayed in a tool group changes resultant from said tracked user indications.

15. A computer-implemented method comprising:
    displaying a first toolbar at a first location,
    said first toolbar comprising at least a first tool group and a second tool group,
    wherein each of said first and said second tool group comprises at least one user-selectable tool,
    wherein visibly designating at least one said tool group by at least one user-manipulatable divider located near at least one end of said tool group,
    wherein said tool group divider is visually distinct from a said tool and from any visible means for directly manipulating said toolbar in its entirety, and
    wherein said tool group divider is user-manipulatable for altering the condition of said tool group;
    selecting said first tool group; and visibly separating said first tool group from said second tool group such that said first tool group becomes visually separated from said first toolbar at its first location.

16. The method according to claim 15, such that said first tool group separation creates a second toolbar.

17. The method according to claim 16, such that said first tool group separation results in said first tool group joining a pre-existing second toolbar.

18. The method according to claim 17, further comprising:

rearranging at least one tool pre-existing on said second toolbar contemporaneous with joining said first tool group to said second toolbar.

19. The method according to claim 16, further comprising:

visually indicating a connectivity between said first tool group and said first toolbar after said visual separation.

* * * * *

(12) INTER PARTES REEXAMINATION CERTIFICATE (0348th)
United States Patent
Odom

(10) Number: US 7,363,592 C1
(45) Certificate Issued: Feb. 21, 2012

(54) TOOL GROUP MANIPULATIONS

(76) Inventor: Gary Odom, Tigard, OR (US)

Reexamination Request:
No. 95/001,208, Jul. 31, 2009

Reexamination Certificate for:
Patent No.: 7,363,592
Issued: Apr. 22, 2008
Appl. No.: 11/125,276
Filed: May 9, 2005

Related U.S. Application Data

(63) Continuation of application No. 09/707,194, filed on Nov. 6, 2000, now Pat. No. 7,036,087.

(51) Int. Cl.
*G06F 13/00* (2006.01)
*G06F 15/00* (2006.01)

(52) U.S. Cl. .................................. 715/779; 715/786
(58) Field of Classification Search .................. None
See application file for complete search history.

(56) References Cited

To view the complete listing of prior art documents cited during the proceeding for Reexamination Control Number 95/001,208, please refer to the USPTO's public Patent Application Information Retrieval (PAIR) system under the Display References tab.

*Primary Examiner* — Joshua Campbell

(57) ABSTRACT

Herein discloses interactive user manipulations of tool groups within toolbars User-responsive tool group manipulation facilitates greater utility, user control, and customization potential, for toolbars.

At the time of issuance and publication of this certificate, the patent remains subject to pending reexamination control number 90/009,703 filed Mar. 10, 2010 respectively. The claim content of the patent may be subsequently revised if a reexamination certificate issues from the reexamination proceeding.

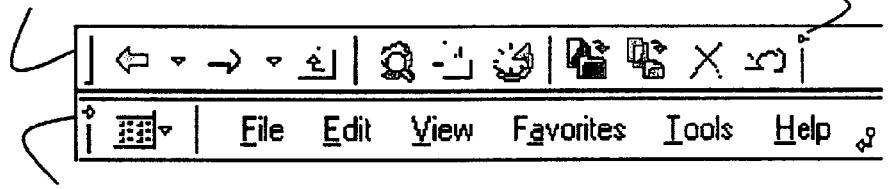

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 8, 10 and 14 are cancelled.
Claims 1-7, 9-13 and 15-19 were not reexamined.

\* \* \* \* \*

US007363592C2

(12) EX PARTE REEXAMINATION CERTIFICATE (8975th)
United States Patent
Odom

(10) Number: US 7,363,592 C2
(45) Certificate Issued: Apr. 17, 2012

(54) TOOL GROUP MANIPULATIONS

(76) Inventor: Gary Odom, Tigard, OR (US)

Reexamination Request:
No. 90/009,703, Mar. 10, 2010

Reexamination Certificate for:
Patent No.: 7,363,592
Issued: Apr. 22, 2008
Appl. No.: 11/125,276
Filed: May 9, 2005

Reexamination Certificate C1 7,363,592 issued Feb. 21, 2012

Related U.S. Application Data

(63) Continuation of application No. 09/707,194, filed on Nov. 6, 2000, now Pat. No. 7,036,087.

(51) Int. Cl.
*G06F 13/00* (2006.01)
*G06F 15/00* (2006.01)

(52) U.S. Cl. .......................................... 715/779; 715/786
(58) Field of Classification Search ................... 715/779
See application file for complete search history.

(56) References Cited

To view the complete listing of prior art documents cited during the proceeding for Reexamination Control Number 90/009,703, please refer to the USPTO's public Patent Application Information Retrieval (PAIR) system under the Display References tab.

*Primary Examiner* — Joshua Campbell

(57) ABSTRACT

Herein discloses interactive user manipulations of tool groups within toolbars User-responsive tool group manipulation facilitates greater utility, user control, and customization potential, for toolbars.

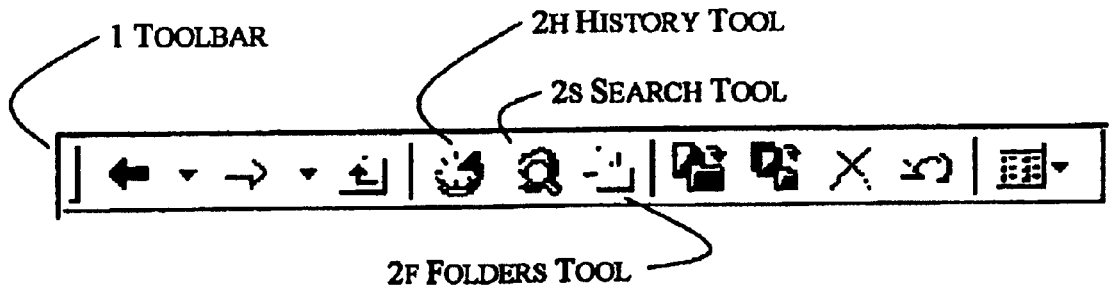

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 7 is confirmed.
Claims 1-6, 9, 11 and 15-18 are cancelled.
Claims 8, 10, 12-14 and 19 were not reexamined.

\* \* \* \* \*